US012077205B2

(12) United States Patent
Hartenstine et al.

(10) Patent No.: US 12,077,205 B2
(45) Date of Patent: Sep. 3, 2024

(54) FOLDABLE CAR SEAT CARRIAGE

(71) Applicant: WONDERLAND SWITZERLAND AG, Steinhausen (CH)

(72) Inventors: Curtis M. Hartenstine, Birdsboro, PA (US); Andrew Ma, Exton, PA (US)

(73) Assignee: WONDERLAND SWITZERLAND AG, Steinhausen (CH)

( * ) Notice: Subject to any disclaimer, the term of this patent is extended or adjusted under 35 U.S.C. 154(b) by 0 days.

(21) Appl. No.: 18/179,108

(22) Filed: Mar. 6, 2023

(65) Prior Publication Data

US 2023/0202548 A1 Jun. 29, 2023

Related U.S. Application Data

(63) Continuation of application No. 17/315,684, filed on May 10, 2021, now Pat. No. 11,597,420, which is a continuation of application No. 16/710,766, filed on Dec. 11, 2019, now Pat. No. 11,027,762.

(60) Provisional application No. 62/788,376, filed on Jan. 4, 2019.

(51) Int. Cl.
    *B62B 7/06* (2006.01)
(52) U.S. Cl.
    CPC .................................. *B62B 7/062* (2013.01)
(58) Field of Classification Search
    CPC ...................................................... B62B 7/062
    See application file for complete search history.

(56) References Cited

U.S. PATENT DOCUMENTS

| 8,322,744 | B2 * | 12/2012 | Ahnert | B62B 9/20 |
| | | | | 280/47.4 |
| 9,260,128 | B2 * | 2/2016 | Liu | B62B 7/08 |
| 2010/0244408 | A1 * | 9/2010 | Dean | B62B 7/142 |
| | | | | 403/103 |
| 2013/0113188 | A1 * | 5/2013 | Liao | B62B 7/062 |
| | | | | 280/650 |
| 2015/0197270 | A1 * | 7/2015 | Sundberg | B62B 7/08 |
| | | | | 280/642 |
| 2015/0329017 | A1 | 11/2015 | Kozinski | |
| 2017/0050661 | A1 * | 2/2017 | Chang | B60N 2/286 |
| 2017/0282952 | A1 * | 10/2017 | Yi | B62B 9/20 |

(Continued)

FOREIGN PATENT DOCUMENTS

| CN | 106043402 A | 10/2016 |
| DE | 20 2014 100 351 U1 | 4/2014 |

(Continued)

*Primary Examiner* — Erez Gurari
(74) *Attorney, Agent, or Firm* — Fay Kaplun & Marcin, LLP

(57) ABSTRACT

A foldable car seat carriage includes a frame unit and an engagement unit. The frame unit includes two leg frames. Each of the leg frames includes two legs pivotable relative to each other, and a driving mechanism. The driving mechanism has opposite ends connected pivotally to the legs at first and second intersections. The engagement unit includes two bayonets. Each of the bayonets has a linking portion connected pivotally to the driving mechanism of a respective one of the leg frames. For each of the leg frames, change of a distance between the first and second intersections of the driving mechanism and the legs during pivot action of the legs converts a position of the engagement unit relative to the legs.

12 Claims, 14 Drawing Sheets

(56) References Cited

U.S. PATENT DOCUMENTS

| | | | | |
|---|---|---|---|---|
| 2017/0313339 A1* | 11/2017 | Ruggiero | ................ | B62B 7/105 |
| 2018/0022372 A1* | 1/2018 | Oakes | ..................... | B62B 7/062 |
| | | | | 280/642 |
| 2018/0043917 A1* | 2/2018 | Plested | ................... | B62B 7/062 |
| 2018/0312188 A1* | 11/2018 | Haut | ......................... | B62B 7/08 |
| 2019/0322304 A1* | 10/2019 | Zhong | .................... | B62B 9/102 |
| 2020/0172143 A1* | 6/2020 | Zhong | .................... | B62B 7/062 |
| 2020/0216106 A1* | 7/2020 | Hartenstine | ............... | B62B 7/08 |
| 2021/0387659 A1* | 12/2021 | Zhang | .................... | B62B 7/083 |
| 2024/0017759 A1* | 1/2024 | Sack | ....................... | B62B 9/203 |

FOREIGN PATENT DOCUMENTS

| | | |
|---|---|---|
| DE | 10 2014 111 141 A1 | 2/2015 |
| DE | 10 2016 208 696 A1 | 11/2016 |
| EP | 2 371 672 A2 | 10/2011 |
| GB | 2431140 A | 4/2007 |

* cited by examiner

FOLDABLE CAR SEAT CARRIAGE

CROSS-REFERENCE TO RELATED APPLICATION

This application is a Continuation application of U.S. patent application Ser. No. 17/315,684 filed on May 10, 2021, now U.S. Pat. No. 11,597,420; which is a Continuation application of U.S. patent application Ser. No. 16/710,766 filed on Dec. 11, 2019, now U.S. Pat. No. 11,027,762; which claims priority of U.S. Provisional Application No. 62/788,376 filed on Jan. 4, 2019. The disclosures of the above application(s)/patent(s) are incorporated herewith by reference.

FIELD

The disclosure relates to a foldable carriage, more particularly to a foldable car seat carriage.

BACKGROUND

For caretakers who may need to bring the infant around in a car seat, a frame may be installed with the car seat for easier transport of the infant in places such as supermarkets and airports.

Currently, two options of such a frame are available. Referring to FIG. 1, a conventional car seat stroller frame may be folded to reduce its volume, but still has a relatively large folded volume and needs to be stored in a car trunk. Referring to FIG. 2, a car seat cart has a reduced folded volume compared with the car seat stroller frame, but has no options for storage and places the infant in a non-ideal position close to the ground.

SUMMARY

Therefore, the object of the disclosure is to provide a foldable car seat carriage that can alleviate the drawbacks of the prior art.

According to a first aspect of the disclosure, a foldable car seat carriage is adapted for installation of a car seat thereon. The foldable car seat carriage includes a frame unit and an engagement unit.

The frame unit includes two leg frames spaced apart from each other in a left-right direction. Each of the leg frames includes two legs, and a driving mechanism.

Each of the legs has opposite upper and lower leg ends, and a hub half that is formed on the upper leg end. The hub halves of the legs are rotatably connected to each other such that the legs are pivotable relative to each other.

The driving mechanism has opposite ends connected pivotally to the legs at first and second intersections.

The engagement unit includes two bayonets. Each of the bayonets has a linking portion connected pivotally to the driving mechanism of a respective one of the leg frames.

For each of the leg frames, change of a distance between the first and second intersections of the driving mechanism and the legs during pivot action of the legs converts a position of the engagement unit relative to the legs.

According to a second aspect of the disclosure, a foldable car seat carriage is adapted for installation of a car seat thereon. The foldable car seat carriage includes a frame unit and an engagement unit.

The frame unit includes two leg frames spaced apart from each other in a left-right direction. Each of the leg frames includes two legs, and a driving mechanism.

Each of the legs has opposite upper and lower leg ends, and a hub half that is formed on the upper leg end. The hub halves of the legs are rotatably connected to each other such that the legs are pivotable relative to each other.

The driving mechanism has opposite ends connected pivotally to the legs.

The engagement unit includes two bayonets. Each of the bayonets has a linking portion connected pivotally to the driving mechanism of a respective one of the leg frames at a third intersection.

For each of the leg frames, change of a distance between the hub halves and the third intersection of the driving mechanism and a respective one of the bayonets during pivot action of the legs converts a position of the engagement unit relative to the legs.

According to a third aspect of the disclosure, a foldable car seat carriage is adapted for installation of a car seat thereon. The foldable car seat carriage includes a frame unit and an engagement unit.

The frame unit includes two leg frames spaced apart from each other in a left-right direction. Each of the leg frames includes two legs, and a driving mechanism.

Each of the legs has opposite upper and lower leg ends, and a hub half that is formed on the upper leg end. The hub halves of the legs are rotatably connected to each other such that the legs are pivotable relative to each other.

The driving mechanism has opposite ends connected pivotally to the legs.

The engagement unit includes two bayonets. Each of the bayonets has a linking portion connected pivotally to the driving mechanism of a respective one of the leg frames.

The engagement unit is driven to move relative to the legs of the leg frames when a distance between the lower leg ends of the legs of each of the leg frames is changed.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
FIG. 1 is a side view of a conventional car seat stroller frame.
Figure 2:
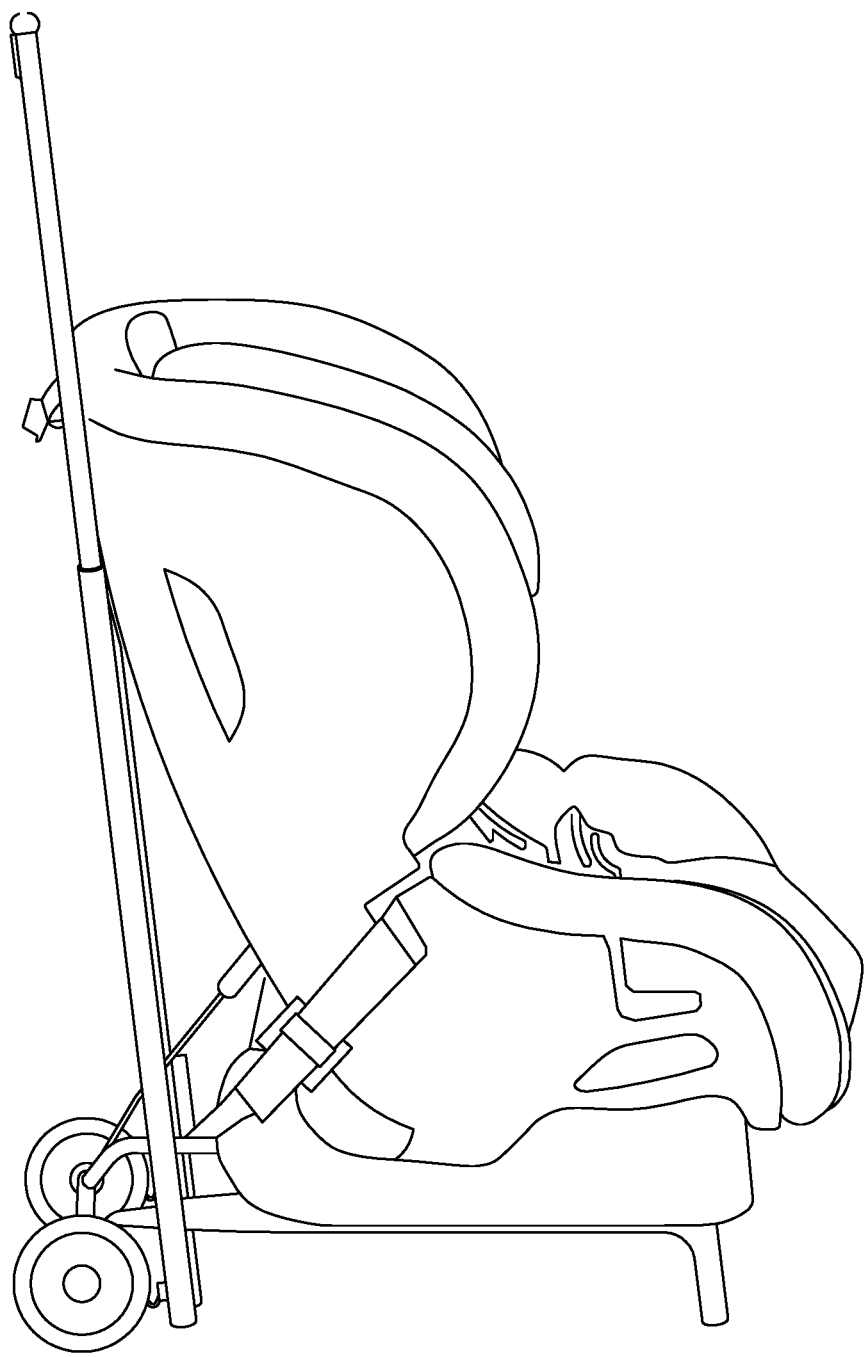
FIG. 2 is a side view of a conventional car seat cart.
Figure 3:
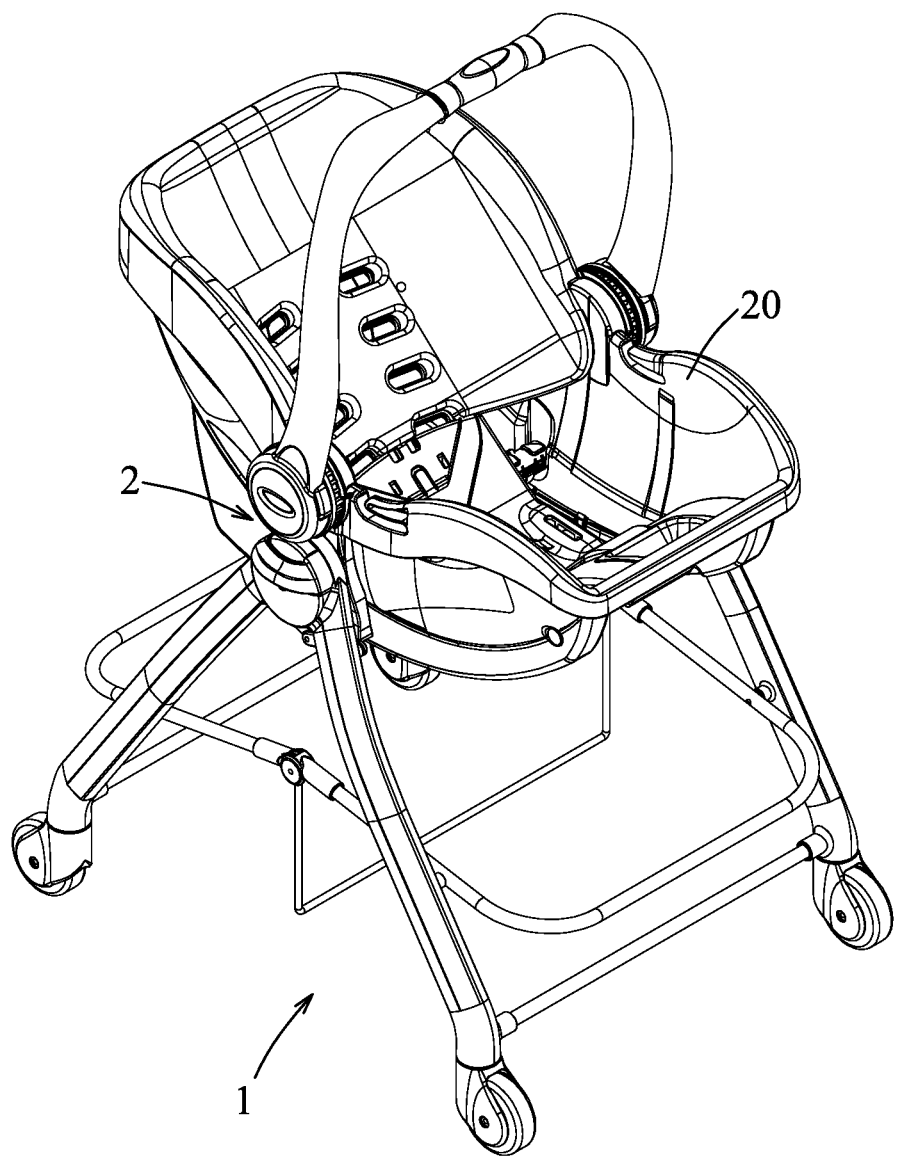
FIG. 3 is a perspective view of an embodiment of a foldable car seat carriage according to the disclosure installed with a car seat.

Referring to FIG. 3, an embodiment of a foldable car seat carriage is adapted for installation of a car seat 20 thereon. A basket (not shown) may also be installed to provide storage space. The foldable car seat carriage includes a frame unit 1 and an engagement unit 2.

Figure 4:
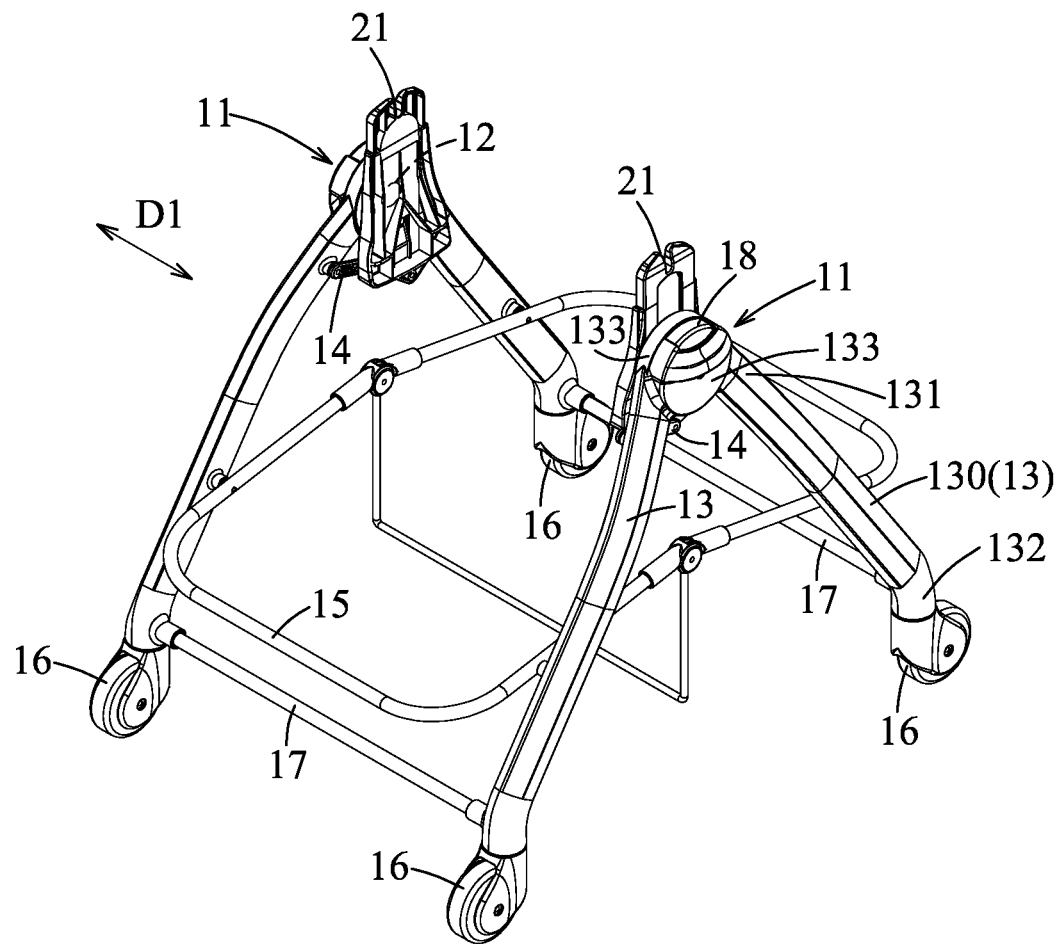
FIG. 4 is a perspective view of the embodiment illustrating a frame unit of the embodiment in a setup state.
Figure 5:
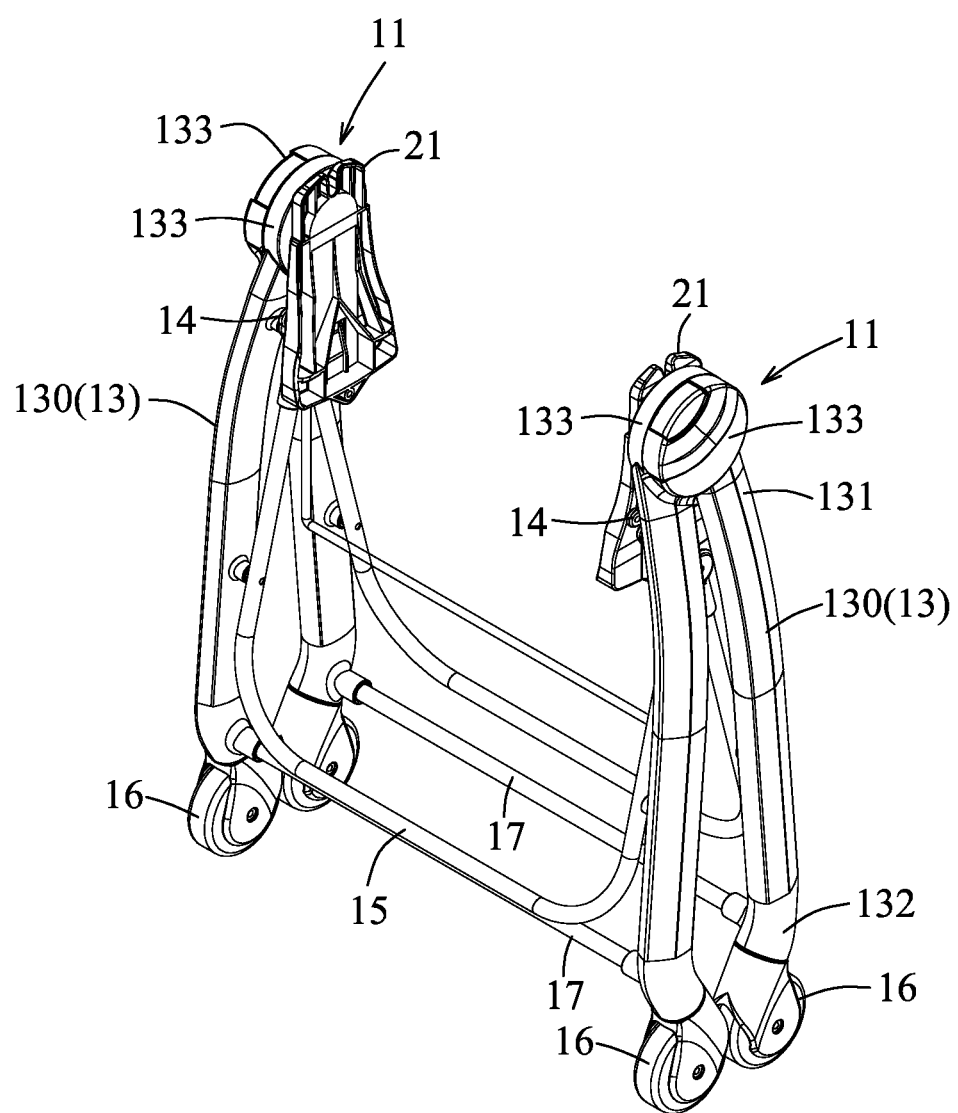
FIG. 5 is a perspective view of the embodiment illustrating a frame unit of the embodiment in a folded state.

Referring to FIGS. 4 and 5, the frame unit 1 includes two leg frames 11 that are spaced apart from each other in a left-right direction (D1), a basket assembly 15, four wheels 16 and at least one bar 17.

Each of the leg frames 11 includes a knob 12, two legs 13, a driving mechanism 14, and a latch 18.

Each of the legs 13 includes a leg body 130 that has opposite upper and lower leg ends 131, 132, and a hub half 133 that is formed on the upper leg end 131. The hub halves 133 of the legs 13 are rotatably connected to each other such that the legs 13 are pivotable relative to each other. In this embodiment, for each of the legs 13, the hub half 133 and the leg body 130 are molded as one piece. In this embodiment, the legs 13 are made using gas-assisted injection molding.

Figure 7:
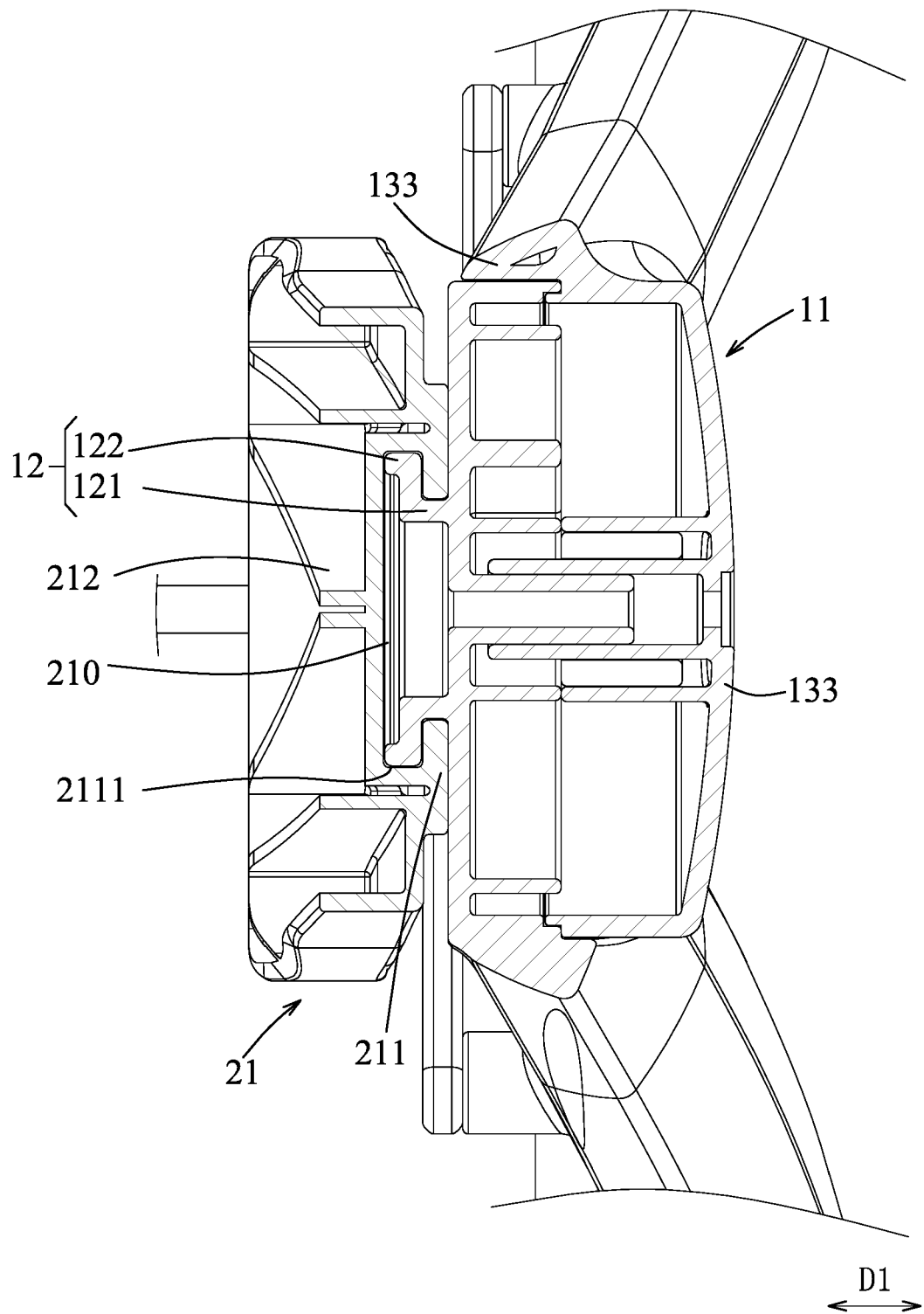
FIG. 7 is a fragmentary sectional view illustrating the hub and a bayonet of the embodiment.

Referring to FIG. 7, the knobs 12 of the leg frames 11 protrude parallel to the left-right direction (D1). In this embodiment, the knobs 12 protrude toward each other. For each of the leg frames 11, the knob 12 has a neck segment 121 protruding from the hub halves 133 of the legs 13, and a head segment 122 connected to a distal end of the neck segment 121 and having a diameter that is larger than that of the neck segment 121. The frame unit 1 is operable via pivot movement between the legs 13 of each of the leg frames 11 to convert between a setup state (see FIGS. 3 and 4), where the lower leg ends 132 of the two legs 13 of each of the leg frames 11 are distal from each other, and a folded state (see FIG. 5), where the lower leg ends 132 of the two legs 13 of each of the leg frames 11 are proximal to each other. In this embodiment, the latch 18 is operable to permit conversion of the frame unit 1 between the setup state and the folded state.

Figure 6:
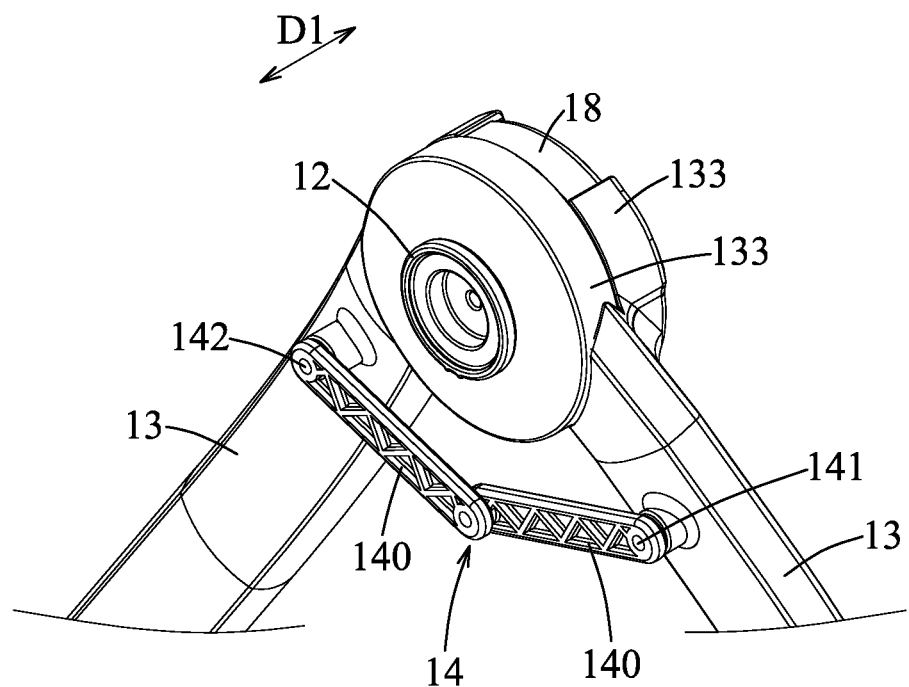
FIG. 6 is a fragmentary perspective view illustrating a hub of the embodiment.

Referring to FIG. 6, for each of the leg frames 11, the driving mechanism 14 includes two links 140 connected respectively and pivotally to the legs 13 at first and second intersections 141, 142, and connected pivotally to each other. The intersection of the links 140 is biased upward toward the hub halves 133 of the legs 13 when the frame unit 1 is converted from the folded state to the setup state.

Figure 8:
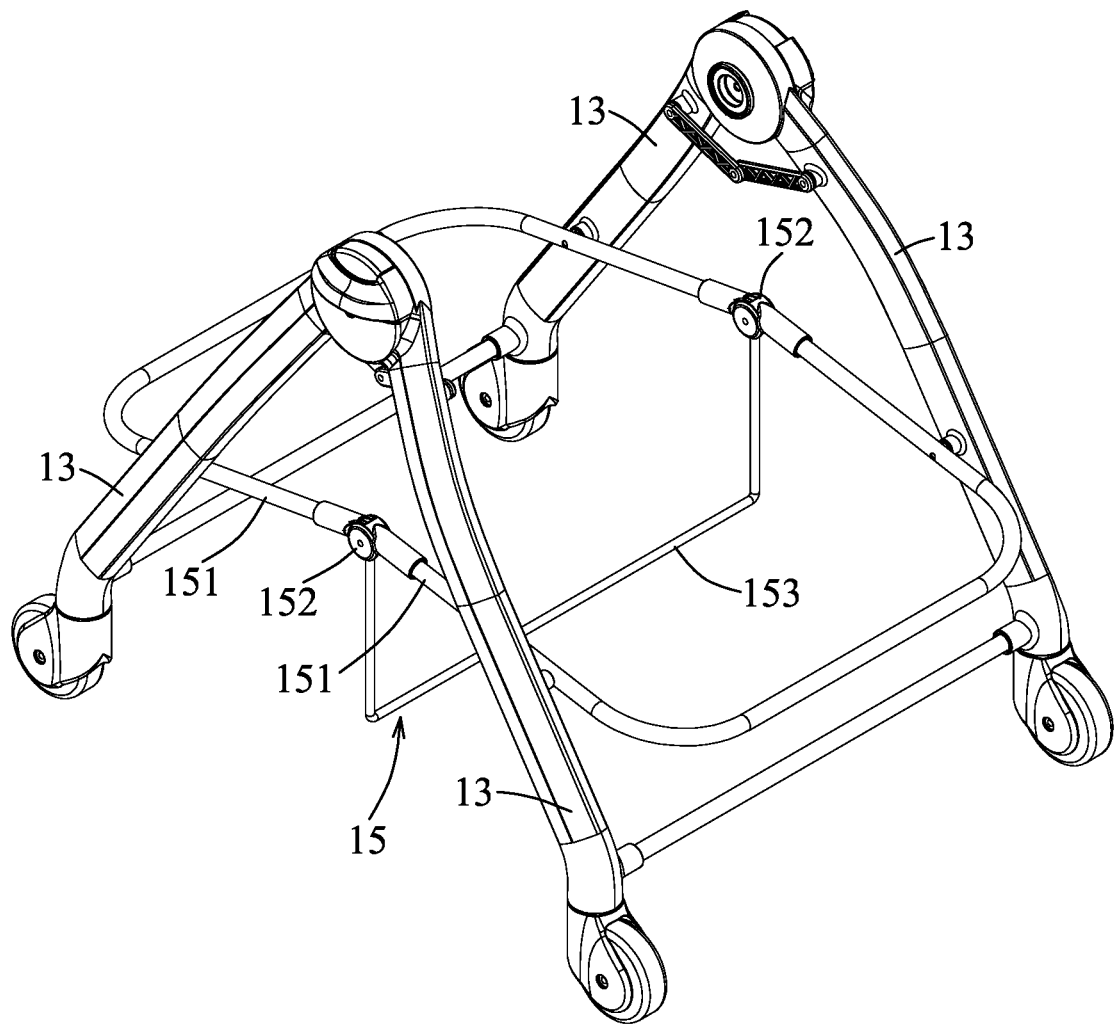
FIG. 8 is a fragmentary perspective view illustrating a basket assembly of the embodiment.

Referring to FIG. 8, the basket assembly 15 is adapted for holding the basket, and includes two U-shaped basket tubes 151 that are connected pivotally between the leg frames 11, two basket hinges 152 connecting the basket tubes 151, and an U-shaped basket support wire 153. The basket hinges 152 are connected respectively to two ends of one of the basket tubes 151 and respectively to two ends of the other one of the basket tubes 151 such that the basket tubes 151 are pivotable relative to each other. The basket support wire 153 is connected to the basket hinges 152, connected between the basket tubes 151, and adapted to provide support to the basket. When the frame unit 1 is in the setup state, the basket tubes 151 are in an inverted V-shaped arrangement with an angle therebetween being substantially 160 degrees such that the basket hinges 152 are driven to move upward during conversion of the frame unit 1 from the setup state to the folded state.

Figure 9:
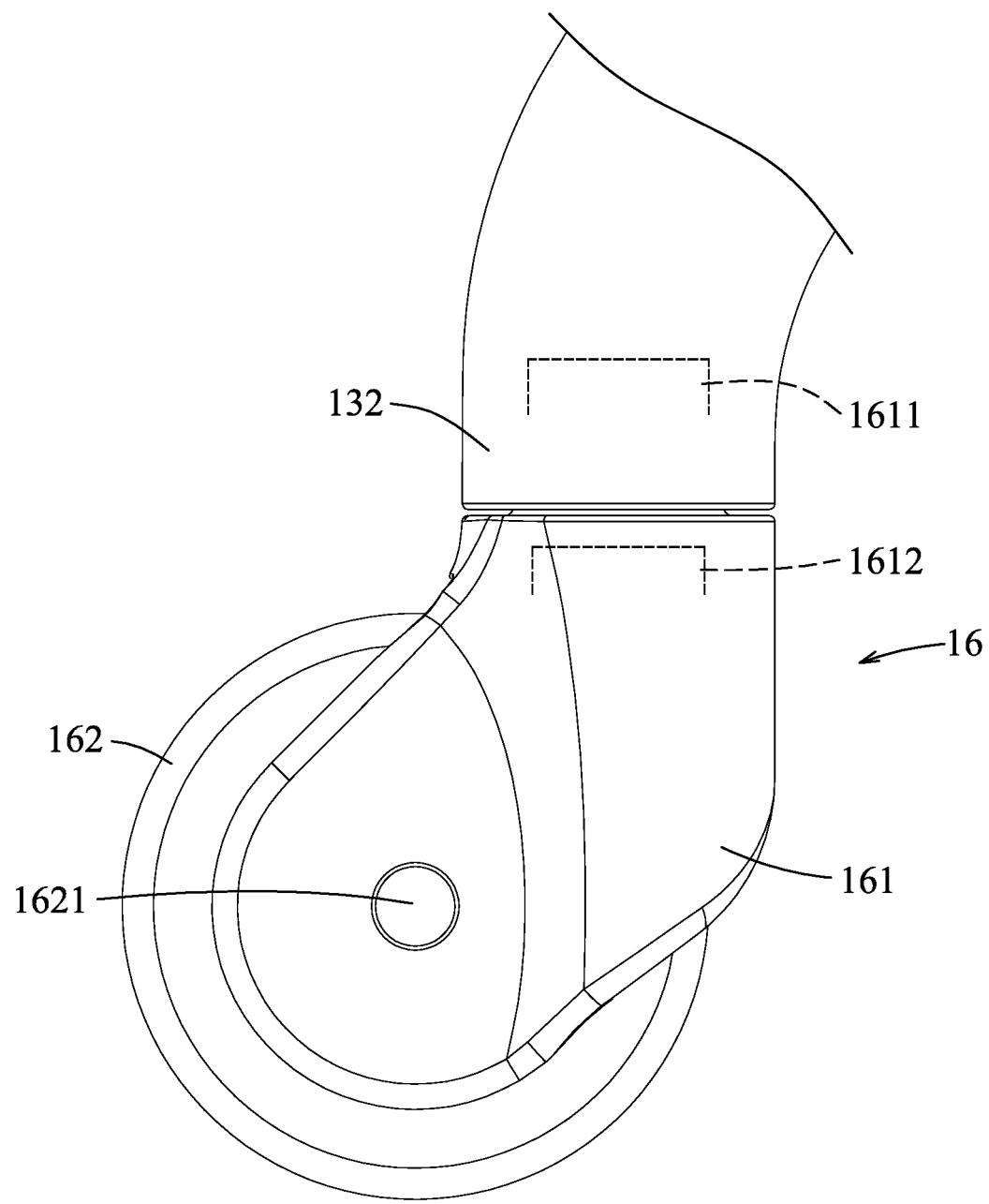
FIG. 9 is a fragmentary side view illustrating a wheel of the embodiment.

Referring to FIG. 9, the wheels 16 are connected respectively to the lower leg ends 132 of the legs 13 of the leg frames 11. In this embodiment, the wheels 16 are swivel casters, and each of the wheels 16 includes a swivel housing 161 connected to the lower leg end 131 of a respective leg 13 via a thrust bearing 1611 above the swivel housing 161 and a radial bearing 1612 below, and a caster wheel 162 connected to the swivel housing 161 with a riveted axle 1621.

Referring back to FIG. 5, the leg frames 11 are connected to each other by the at least one bar 17. Specifically, the at least one bar 17 extends in the left-right direction (D1) and is connected fixedly between the legs 13 of the leg frames 11 such that an angle defined between the legs 13 of one of the leg frames 11 remains the same as that of the other one of the leg frames 11. In this embodiment, the at least one bar 17 includes two bars 17.

Figure 10:
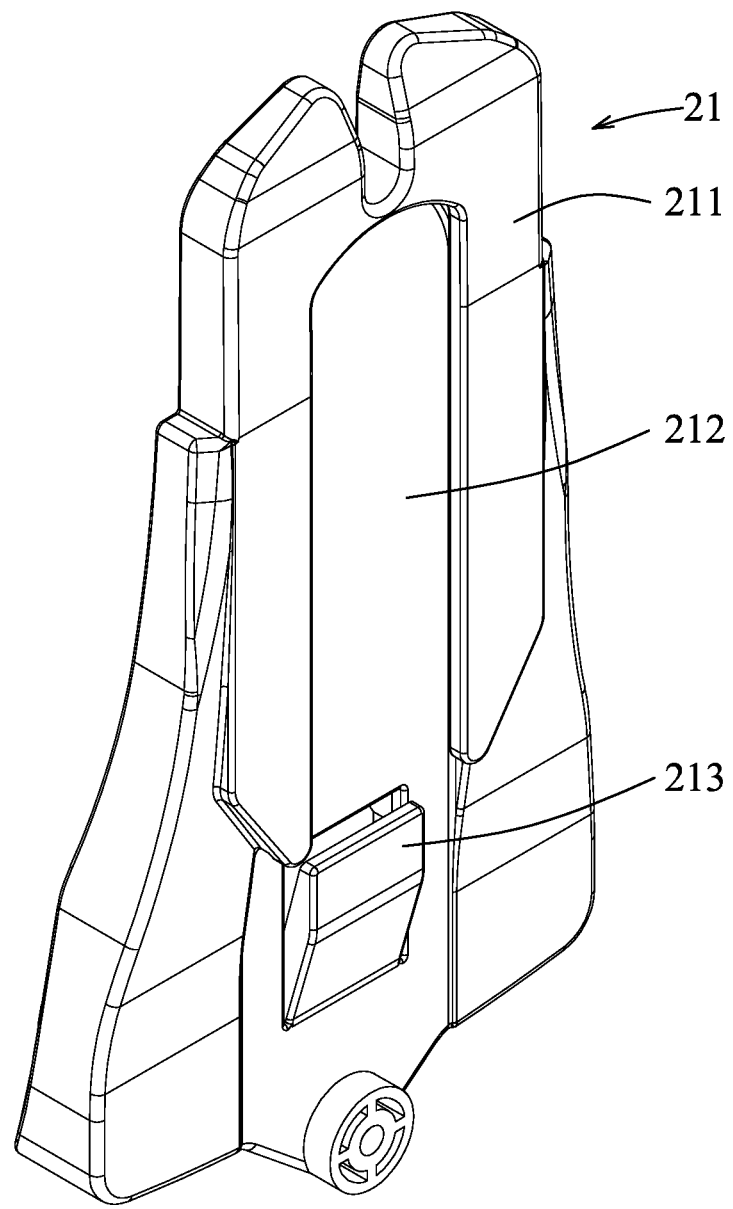
FIG. 10 is a perspective view of the bayonet.

The engagement unit 2 including two bayonets 21. Referring to FIG. 10, each of the bayonets 21 has a track portion 211, a linking portion 212, and a stop block 213.

Referring back to FIG. 7, the track portion 211 of each of the bayonets 21 is coupled slidably with the knob 12 of a respective one of the leg frames 11.

Figure 11:
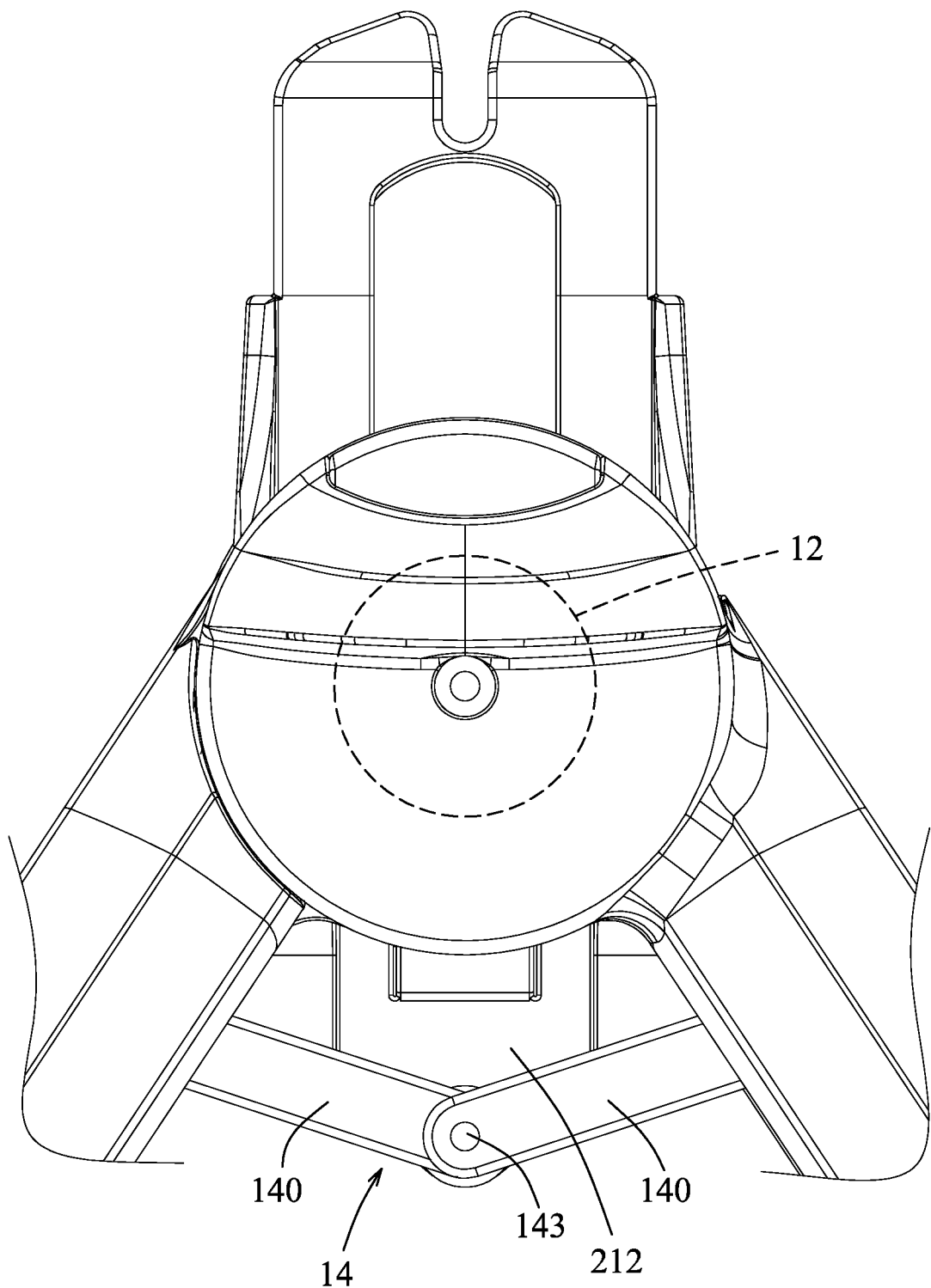
FIG. 11 is a fragmentary side view illustrating the bayonet at an extended position.
Figure 12:
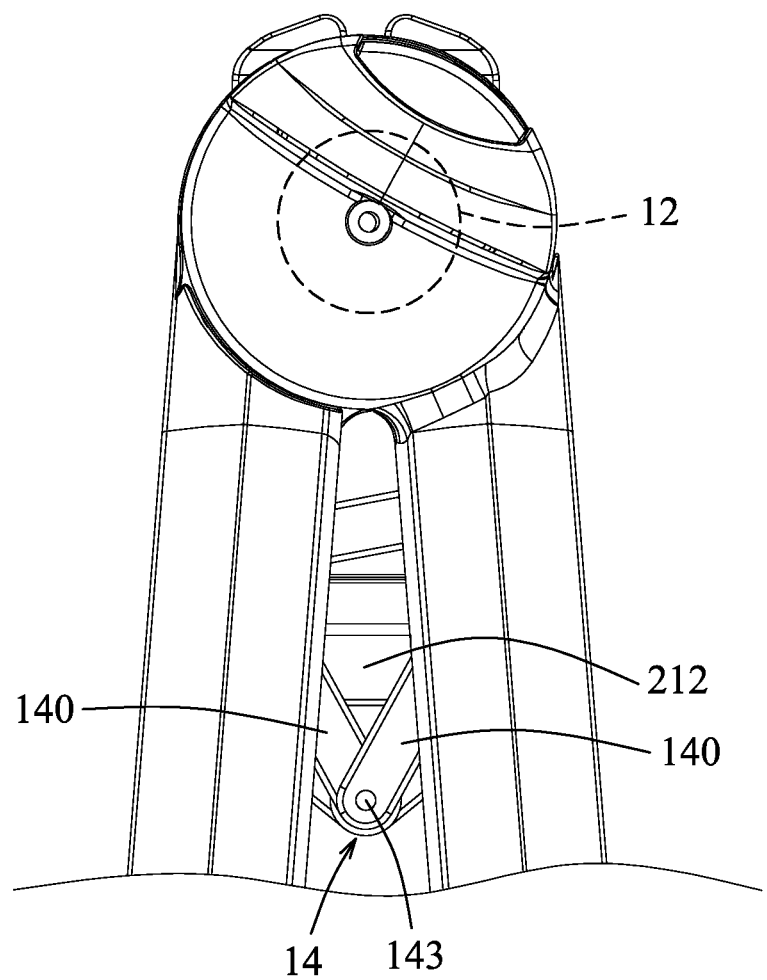
FIG. 12 is a fragmentary side view illustrating the bayonet at a retracted position.

Referring to FIGS. 11 and 12, for each of the bayonets 21, the linking portion 212 is connected to the track portion 211 and is connected pivotally to an intersection of the links 140 of the driving mechanism 14 of the respective one of the leg frames 11 at a third intersection 143.

During conversion of the frame unit 1 from the setup state to the folded state, each of the bayonets 21 is driven by the driving mechanism 14 of the respective one of the leg frames 11 to slide downward relative to the knob 12 from an extended position (see FIG. 11), where a top end of the bayonet 21 is distal from the respective one of the leg frames 11 for permitting the bayonet 21 to be coupled to the car seat 20, to a retracted position (see FIG. 12), where the top end of the bayonet 21 is adjacent to the respective one of the leg frames 11. Conversely, each of the bayonets 21 is moved upward by the driving mechanism 14 of the respective one of the leg frames 11 to the extended position during conversion of the frame unit 1 from the folded state to the setup state. For each of the leg frames 11, change of a distance between the first and second intersections 141, 142 of the driving mechanism 14 and the legs 13 during pivot action of the legs 13 converts a position of the engagement unit 2 relative to the legs. For each of the leg frames 11, change of a distance between the hub halves 133 and the third intersection 143 of the driving mechanism 14 and a respective one of the bayonets 21 during pivot action of the legs 13 also converts a position of the engagement unit 2 relative to the legs 13. Since, for each of the leg frames 11, the links 140 of the driving mechanism 14 are pivotally and respectively connected to the legs 13 and to the respective one of the bayonet 21, the engagement unit 2 is driven to move relative to the legs 13 of the leg frames 11 when a distance between the lower leg ends 132 of the legs 13 of each of the leg frames 11 is changed. At the retracted position, the bayonets 21 overlapped respectively with the leg frames 11 so as to reduce a folded volume of the foldable car seat carriage.

Figure 13:
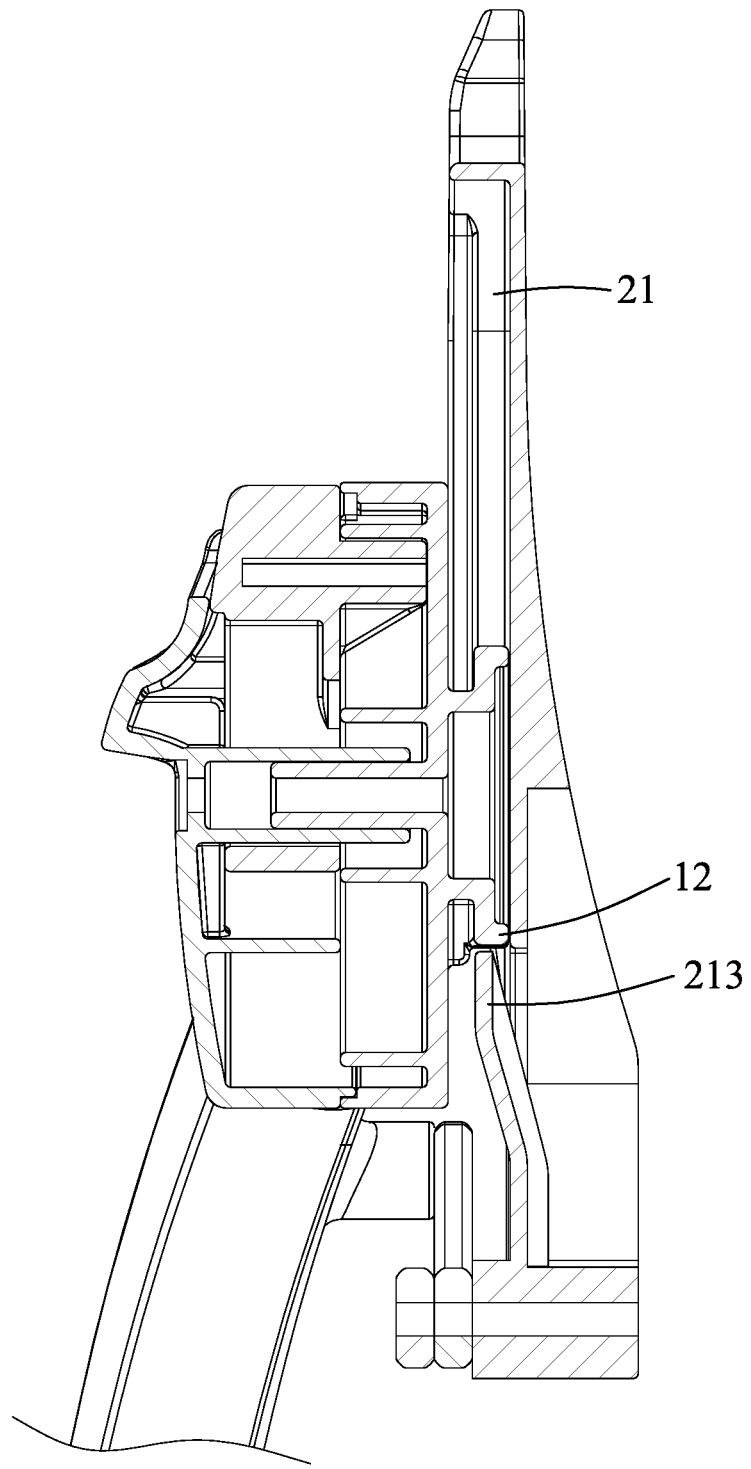
FIG. 13 is a fragmentary sectional view illustrating the bayonet at the extended position.

Referring to FIG. 13, the stop block 213 of each of the bayonets 21 protrudes from the linking portion 212 and abuts against the knob 12 of the respective one of the leg frames 11 when the bayonet 21 is at the extended position. In this embodiment, the stop block 213 is a flexi-finger stop to permit easy installation of the bayonet 21 onto the hub 12.

Referring back to FIGS. 7 and 10, in this embodiment, for each of the bayonets 21, the track portion 211 is inverted U-shaped, is formed with an inverted U-shaped engaging groove 2111, has a thickness in the left-right direction (D1) larger than that of the linking portion 212, and cooperates with the linking portion 212 to define a receiving space 210 therebetween. The receiving space 210 of each of the bayonets 21 receives the knob 12 of the respective one of the leg frames 11 with the engaging groove 2111 of the track portion 211 of the bayonet 21 engaged with the head segment 122 of the knob 12 of the respective one of the leg frames 11.

Figure 14:
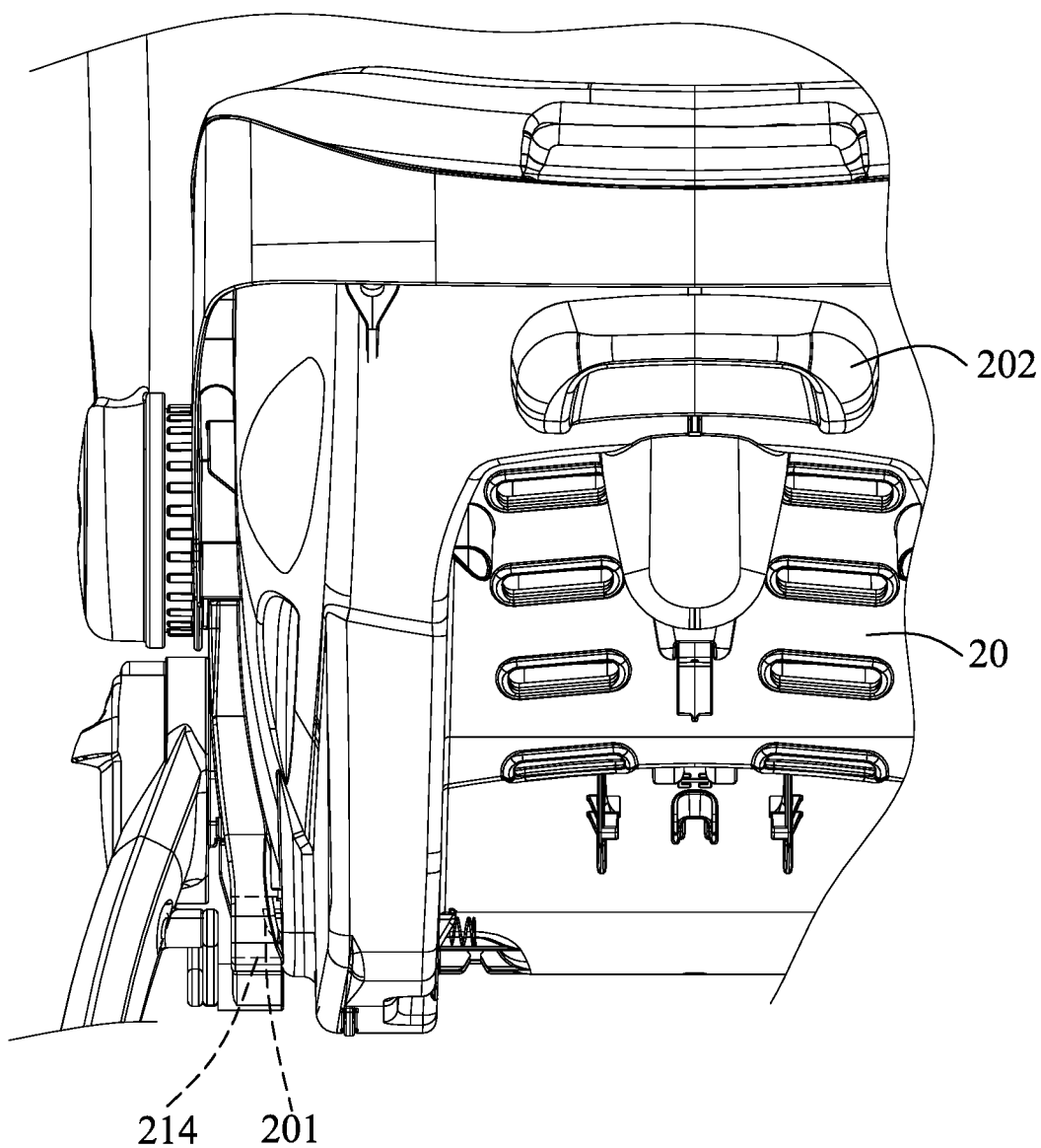
FIG. 14 is a fragmentary perspective view illustrating an engaging plunger of the car seat engaged with the bayonet of the embodiment.

Referring to FIG. 14, the car seat 20 has two engaging plungers 201 (only one is shown) protruding from a seat body of the car seat 20, and each of the bayonets 21 further has a plunger engaging hole 214 formed in the linking portion 212 and being engaged with a respective one of the plungers 201. The engaging plungers 201 are operable via a release button 202 to be disengaged respectively from the plunger engaging hole 214 of the bayonets 21 and retract into the seat body.

To convert the frame unit 1 from the folded state to the setup state, a user grabs the hubs 12 and press down on the latches 18 of the leg frames 11 while pushing the wheels 16 against the ground. The wheels 16 allow the legs 13 of each of the leg frames 11 to pivot relative to each other until the angle between the legs 13 is at a predetermined angle and the hub halves 133 of the legs 13 lock the frame unit 1 into the setup state. As the frame unit 1 is being converted to the setup state, the bayonets 21 are driven upwards into the extended position. When the bayonets 21 are at the extended position, the car seat 20 may be installed onto the engagement unit 2 by lowering the car seat 20 onto the engagement unit 2 until the engagement plungers 201 respectively engage the plunger engaging holes 214 of the bayonets 21.

When the user presses the release button 202 to retract the engagement plungers 201, the car seat 20 can be disengaged from the engagement unit 2 and removed from the foldable car seat carriage. To convert the frame unit 1 from the setup state to the folded state once the car seat 20 has been removed, the latches 18 are pressed down on and the frame unit 1 is lifted off the ground to allow the weight of the legs 13 to drive the leg frames 11 to automatically fold. As the frame unit 1 is converted to the folded state, the bayonets 21 are driven downward into the retracted position to reduce the folded volume of the foldable car seat carriage.

The embodiment of the foldable car seat carriage has the advantage of a small folded volume achieved through the retractable bayonets, while retaining features such as the option of adding a basket for storage. The relatively small folded volume of the foldable car seat carriage allows it to be stowed in a car footwell area instead of the trunk of the car to allow quick stowaway and retrieval. In this embodiment, a handle is not included and the foldable car seat carriage is intended to be maneuvered using a handle of the car seat 20 which further reduces the folded volume.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A foldable child seat carriage configured to support a child seat thereon, comprising:
   a frame being foldable between a folded state and an unfolded state, the frame including a first hub; and
   a first car seat adapter configured to couple to the child seat, the first car seat adapter being movably connected to the first hub such that when the frame transitions from the unfolded state to the folded state, the first car seat adapter moves from an extended position to a retracted position,
   wherein, in the extended position, the first car seat adapter extends from the first hub at an extended distance and
   wherein, in the retracted position, the first car seat adapter extends from the first hub at a retracted distance that is less than the extended distance.

2. The carriage of claim 1, wherein the frame includes a first part and a second part pivotally connected to one another via the first hub and wherein the first car seat adapter is coupled to the frame via a first linkage.

3. The carriage of claim 2, wherein the first linkage includes a pair of links pivotally connected to one another, a first one of the links of the first linkage being pivotally connected to the first part of the frame and a second one of the links of the first linkage being pivotally connected to the second part of the frame.

4. The carriage of claim 3, wherein the first part of the frame includes a first knob protruding therefrom and wherein the first car seat adapter is slidably coupled to the first knob so that, as the first and second parts of the frame are folded relative to one another, the links of the first linkage rotate relative to one another and move the first car seat adapter slidably relative to the first hub between the extended and retracted positions.

5. The carriage of claim 4, wherein the first car seat adapter includes a stop block positioned to abut against the first knob when the first car seat adapter is at the extended position.

6. The carriage of claim 1, wherein the first car seat adapter is formed as a bayonet configured to releasably lockingly engage a car seat.

7. The carriage of claim 2, wherein the frame includes four wheels connected respectively to lower ends of legs of the first and second parts of the frame.

8. The carriage of claim 3, wherein a linking portion of the first car seat adapter pivotally connected to an intersection of the links of the first linkage.

9. The carriage of claim 8, wherein the links of the first linkage are arranged so that, when the frame is moved to the folded state, the intersection of the links of the first linkage moves further from the first hub.

10. The carriage of claim 8, wherein the intersection of the links of the first linkage is biased to urge the first car seat adapter to the extended position when the frame is moved to the unfolded state.

11. The carriage of claim 10, wherein the frame further includes a latch operable to releasably lock the frame in the unfolded state and to be selectively released to permit the frame to be moved to the folded state.

12. The carriage of claim 1, further comprising:
- a second car seat adapter configured to couple to the child seat,
- wherein the frame includes a second hub at which the first and second parts of the frame are pivotally connected to one another,
- wherein the second car seat adapter is movably connected to the second hub such that when the frame transitions from the unfolded state to the folded state, the second car seat adapter moves from an extended position to a retracted position, and
- wherein, in the extended position, the second car seat adapter extends from the second hub at an extended distance, and in the retracted position the second car seat adapter extends from the second hub at a retracted distance that is less than the extended distance.

* * * * *